United States Patent
Wu et al.

(10) Patent No.: US 10,417,046 B2
(45) Date of Patent: Sep. 17, 2019

(54) DISPLAY METHOD FOR OPERATING SYSTEMS, DISPLAY DEVICE FOR OPERATING SYSTEMS, AND MULTI-SYSTEM TERMINAL

(71) Applicant: Yulong Computer Telecommunication Scientific (Shenzhen) Co., Ltd., Shenzhen, Guangdong (CN)

(72) Inventors: Chiqiang Wu, Guangdong (CN); Zhengyi Huang, Guangdong (CN)

(73) Assignee: Yulong Computer Telecommunication Scientific (Shenzhen) Co., Ltd., Shenzhen, Guangdong (CN)

(*) Notice: Subject to any disclaimer, the term of this patent is extended or adjusted under 35 U.S.C. 154(b) by 63 days.

(21) Appl. No.: 15/521,557

(22) PCT Filed: Jul. 31, 2015

(86) PCT No.: PCT/CN2015/085889
§ 371 (c)(1),
(2) Date: Apr. 24, 2017

(87) PCT Pub. No.: WO2016/107170
PCT Pub. Date: Jul. 7, 2016

(65) Prior Publication Data
US 2017/0308414 A1    Oct. 26, 2017

(30) Foreign Application Priority Data

Dec. 31, 2014 (CN) .......................... 2014 1 0855485

(51) Int. Cl.
*G06F 9/50* (2006.01)
*G06F 9/48* (2006.01)
(Continued)

(52) U.S. Cl.
CPC .............. *G06F 9/50* (2013.01); *G06F 9/4405* (2013.01); *G06F 9/44505* (2013.01);
(Continued)

(58) Field of Classification Search
CPC ........ G06F 9/45533; G06F 9/541; G06F 9/48; G06F 9/44505; G06F 9/4405; G06F 9/45504; G06F 9/4843
See application file for complete search history.

(56) References Cited

U.S. PATENT DOCUMENTS

2008/0168235 A1* 7/2008 Watson .................. G06F 9/485
                                                                      711/135
2009/0259942 A1* 10/2009 Bitonti ................... G06F 3/167
                                                                      715/727
(Continued)

FOREIGN PATENT DOCUMENTS

CN         101770390 A      7/2010
CN         103049232 A      4/2013
(Continued)

OTHER PUBLICATIONS

Magnusson et al., "Simics: A Full System Simulation Platform" (Feb. 2002), Computer, vol. 35, Issue 2, pp. 50-58 [retrieved from https://ieeexplore.ieee.org/abstract/document/982916].*
Extended European Search Report dated Apr. 24, 2018 in corresponding EP Application No. 15874859.0.

*Primary Examiner* — Brian W Wathen
(74) *Attorney, Agent, or Firm* — Young Basile Hanlon & MacFarlane, P.C

(57) ABSTRACT

The present disclosure provides a display method for operating systems, a display device for operating systems, and a multi-system terminal. The display method includes: running multiple operating systems simultaneously; and displaying each of the multiple operating systems in a preset display mode. The multi-system operating system that are
(Continued)

run simultaneously is displayed on one or more display screens, and restarting a terminal is avoided when switching the operating systems, thus a user operates the multiple operating system simultaneously or separately, which facilitates user's operation and improves user's experience.

8 Claims, 6 Drawing Sheets

(51) Int. Cl.
  *G06F 9/445* (2018.01)
  *G06F 9/54* (2006.01)
  *G06F 9/4401* (2018.01)
  *G06F 9/455* (2018.01)
(52) U.S. Cl.
  CPC ............ *G06F 9/45504* (2013.01); *G06F 9/48* (2013.01); *G06F 9/4843* (2013.01); *G06F 9/5016* (2013.01); *G06F 9/541* (2013.01)

(56) References Cited

U.S. PATENT DOCUMENTS

| 2014/0129739 | A1* | 5/2014 | King | G06F 13/10 710/8 |
|---|---|---|---|---|
| 2014/0351810 | A1 | 11/2014 | Pratt et al. | |
| 2014/0373007 | A1 | 12/2014 | Donnellan et al. | |
| 2015/0193904 | A1* | 7/2015 | Vermeulen | G06T 1/20 345/522 |
| 2016/0328241 | A1* | 11/2016 | Song | G06F 9/4403 |

FOREIGN PATENT DOCUMENTS

| CN | 103257837 A | 8/2013 |
|---|---|---|
| CN | 104049858 A | 9/2014 |
| CN | 104123113 A | 10/2014 |
| CN | 104216777 A | 12/2014 |
| CN | 104461726 A | 3/2015 |

* cited by examiner

DISPLAY METHOD FOR OPERATING SYSTEMS, DISPLAY DEVICE FOR OPERATING SYSTEMS, AND MULTI-SYSTEM TERMINAL

CROSS-REFERENCE TO RELATED APPLICATION(S)

This application is the national stage of PCT/CN2015/085889, filed Jul. 31, 2015, which claims priority to Chinese Patent Application No. 201410855485.2, entitled "DISPLAY METHOD FOR OPERATING SYSTEMS, DISPLAY DEVICE FOR OPERATING SYSTEMS, AND MULTI-SYSTEM TERMINAL", filed on Dec. 31, 2014, the disclosures of which are hereby incorporated in their entireties by reference.

TECHNICAL FIELD

The present disclosure relates to terminal technology filed, and particularly to a display method for operating systems, a display device for operating systems, and a multi-system terminal.

BACKGROUND

Presently, a terminal can have various operating systems, for example, IOS operating system (mobile operating system developed by Apple Inc.), Android operating system (operating system developed by Google Inc.), Windows phone operating system (mobile phone operating system developed by Microsoft Inc.), and so on. The principle of installing various operating systems in a terminal includes following: installing different operating systems in different parts of a memory of the terminal, and when the terminal is started, a booting software boots up a selected operating system. However, no matter how many operating systems the terminal has, when the terminal is started, just one operating system is started. When a user wants to use another operating system, the user needs to restart the terminal, and switches operating systems through a human-machine interface, which brings great inconvenience to the user when the user wants to use other operating systems, and user's requirement for operating multiple operating systems simultaneously or separately cannot be satisfied.

Therefore, what is needed is a new technology which can display multiple running operating systems simultaneously when the multiple operating systems are run simultaneously.

SUMMARY

Based on the above problems, the present disclosure provides a new technical solution which can display multiple running operating systems simultaneously when the multiple operating systems are run simultaneously.

In view of this, the present disclosure provides a display method for operating systems. The display method for operating system is applied in a terminal which has multiple operating systems and comprises: running the multiple operating systems simultaneously; and displaying each of the multiple operating systems in a preset display mode.

In the technical solution, different operating systems are installed in different parts of a memory of the terminal. Multiple sets of virtual hardware can be generated by hardware virtual technology. The multiple operating systems are simultaneously run by the multiple sets of virtual hardware, and each of the multiple operating systems is displayed in a preset display mode, thus a user can operate the multiple operating systems simultaneously according to needs, which facilitates user's operation, and reduces time of switching operating systems through a human-computer interface. For example, when the user uses his or her own device in the office, the operating system for work and other ordinary operating systems of the device can be run simultaneously, thus the user can operate these operating systems simultaneously or separately to take public and private interests into account, accordingly user's operation is facilitated, and time for switching systems is reduced.

In the technical solution, preferably, the preset display mode includes: displaying any of the multiple operating systems on any display screen separately; or displaying both of the any of the multiple operating systems and at least one other operating system of the multiple operating systems on the any display screen; or hiding the any of the multiple operating systems.

In the technical solution, different operating systems can be displayed on different display screens, and multiple operating systems can also be displayed on one display screen. Wherein, when the multiple operating systems are displayed on one display screen, the display screen can be divided into multiple display regions, and each display region is configured to display one operating system interface. Additionally, a display status of the operating system displayed on the display screen can be set to be a hidden status. Hiding the operating system referred herein is similar to minimizing a window. That is, the hidden operating system is still run and is not exited, and the user can cause the hidden operating system to be displayed on the display screen at any time via inputting a display command. By means of the technical solution, a display method for multiple operating systems is provided, thus user's various requirements can be satisfied.

In the above technical solution, preferably, the display method further includes: setting any of the multiple operating systems to be a main system according to a received setting command; and when the terminal detects a command or request which is not able to be determined for which of the multiple operating systems, receiving and processing the command or request by the main system.

In the technical solution, although multiple sets of virtual hardware are generated by the hardware virtual technology, actually the terminal just has one set of hardware, thus under many conditions, the terminal cannot determine that a received request or command is for which of the operating systems. Therefore, by setting the main system, the command or request which cannot be determined for which of the operating systems can be sent to the main system, and the main system receives and processes the command or request. For example, a terminal has a operating system A and a operating system B, and the operating system A is set to be the main system. When the terminal displays both of the running operating system A and the running operating system B on the display screen, if a page refresh command from a keyboard is detected, as it cannot be determined that the page refresh command is for the operating system A, the operating system B, or both of the operating system A and the operating system B, the operating system A which is set to be the main system receives the page refresh command, and executes the page refresh command and/or instructs the operating system B to execute the page refresh command.

In the above technical solution, preferably, the display method further includes: adjusting a time proportion that any of the multiple operating systems takes up a central processing unit of the terminal and/or a memory proportion that any of the multiple operating systems takes up a memory of the terminal according to a received adjusting command.

In the technical solution, when the user wants performance of a certain running operating system to be high, the user can set the time proportion that the operating system takes up the central processing unit and/or the memory proportion that the operating system takes up the memory of the terminal to be high, thus the operating system can take up more disk space, and the running efficiency of the operating system can be enhanced, accordingly user's requirements can be satisfied.

In the above technical solution, preferably, the adjusting command is configured to turn on or turn off the display screen which is used for displaying the any of the multiple operating systems, or the adjusting command is configured to change the preset display mode for the any of the multiple operating systems.

In the technical solution, by adjusting the time proportion that each operating system takes up the central processing unit of the terminal and/or the memory proportion that each operating system takes up the memory of the terminal at any time, a high running speed and a high storing speed of the operating system which is currently used by the user can be obtained, accordingly user's experience is improved. For example, for a flip dual screen dual system phone, when an action of opening or closing a cover is executed, it is determined that an adjusting command is input. When the user opens the cover, generally speaking, it means that the user wants to watch content displayed on an inner display screen, and does not need to watch content displayed on an outer display screen. Therefore, when receiving the adjusting command generated by opening the cover, the time proportion that the operating system displayed on the outer display screen takes up the central processing unit of the terminal and/or the memory proportion that the operating system displayed on the outer display screen takes up the memory of the terminal can be reduced to be least, and the high work efficiency of the operating system displayed on the inner display screen can be ensured.

Additionally, various preset display modes for the operating system can be included. For example, for the flip dual screen dual system phone, the operating system can be set to be displayed on the outer display screen, and can also be set to be displayed on the inner display screen. When the multiple operating systems are displayed on the same display screen, the operating system can be set to be displayed in a certain display region of the display screen. Furthermore, when the display region is clicked, it is determined that an adjusting command is input. When the user clicks the display region, the operating system displayed in the display region is displayed in full screen, and other operating systems are run in the background and are hidden.

According to another aspect of the present disclosure, a display device for operating systems is provided. The display device for operating systems is applied in a terminal which has multiple operating systems and comprises a running unit configured to run the multiple operating systems simultaneously, and a displaying unit configured to display each of the multiple operating systems in a preset display mode.

In the technical solution, different operating systems are installed in different parts of a memory of the terminal. Multiple sets of virtual hardware can be generated by hardware virtual technology. The multiple operating systems are simultaneously run by the multiple sets of virtual hardware, and each of the multiple operating systems is displayed in a preset display mode, thus a user can operate the multiple operating systems simultaneously according to needs, which facilitates user's operation, and reduces time of switching operating systems through a human-computer interface. For example, when the user uses his or her own device in the office, the operating system for work and other ordinary operating systems of the device can be run simultaneously, thus the user can operate these operating systems simultaneously or separately to take public and private interests into account, accordingly user's operation is facilitated, and time for switching systems is reduced.

In the technical solution, preferably, the preset display mode includes: displaying any of the multiple operating systems on any display screen separately; or displaying both of the any of the multiple operating systems and at least one other operating system of the multiple operating systems on the any display screen; or hiding the any of the multiple operating systems.

In the technical solution, different operating systems can be displayed on different display screens, and multiple operating systems can also be displayed on one display screen. Wherein, when the multiple operating systems are displayed on one display screen, the display screen can be divided into multiple display regions, and each display region is configured to display one operating system interface. Additionally, a display status of the operating system displayed on the display screen can be set to be a hidden status. Hiding the operating system referred herein is similar to minimizing a window. That is, the hidden operating system is still run, and the user can cause the hidden operating system to be displayed on the display screen at any time via inputting a display command. By means of the technical solution, a display method for multiple operating systems is provided, thus user's various requirements can be satisfied.

In the above technical solution, preferably, the display device further includes a setting unit configured to set any of the multiple operating systems to be a main system according to a received setting command, and a control unit. The control unit is configured to control the main system to receive and process a command or request when the control unit detects the command or request which is not able to be determined for which of the multiple operating systems.

In the technical solution, although multiple sets of virtual hardware are generated by the hardware virtual technology, actually the terminal just has one set of hardware, thus under many conditions, the terminal cannot determine that a received request or command is for which of the operating systems. Therefore, by setting the main system, the command or request which cannot be determined for which of the operating systems can be sent to the main system, and the main system receives and processes the command or request. For example, a terminal has an operating system A and an operating system B, and the operating system A is set to be the main system. When the terminal displays both of the running operating system A and the running operating system B on the display screen, if a page refresh command from a keyboard is detected, as it cannot be determined that the page refresh command is for the operating system A, the operating system B, or both of the operating system A and the operating system B, the operating system A which is set to be the main system receives the page refresh command, and executes the page refresh command and/or instructs the operating system B to execute the page refresh command.

In the above technical solution, preferably, the display device further includes an adjusting unit configured to adjust a time proportion that any of the multiple operating systems takes up a central processing unit of the terminal and/or a memory proportion that any of the multiple operating systems takes up a memory of the terminal according to a received adjusting command.

In the technical solution, when the user wants performance of a certain running operating system to be high, the user can set the time proportion that the operating system takes up the central processing unit and/or the memory proportion that the operating system takes up the memory of the terminal to be high, thus the operating system can take up more disk space, and the running efficiency of the operating system can be enhanced, accordingly user's requirements can be satisfied.

In the above technical solution, preferably, the adjusting command is configured to turn on or turn off the display screen which is used for displaying the any of the multiple operating systems, or the adjusting command is configured to change the preset display mode for the any of the multiple operating systems.

In the technical solution, by adjusting the time proportion that each operating system takes up the central processing unit of the terminal and/or the memory proportion that each operating system takes up the memory of the terminal at any time, a high running speed and a high storing speed of the operating system which is currently used by the user can be obtained, accordingly user's experience is improved. For example, for a flip dual screen dual system phone, when an action of opening or closing a cover is executed, it is determined that an adjusting command is input. When the user opens a cover, generally speaking, it means that the user wants to watch content displayed on an inner display screen, and does not need to watch content displayed on an outer display screen. Therefore, when receiving the adjusting command generated by opening the cover, the time proportion that the operating system displayed on the outer display screen takes up the central processing unit of the terminal and/or the memory proportion that the operating system displayed on the outer display screen takes up the memory of the terminal can be reduced to be least, and the high work efficiency of the operating system displayed on the inner display screen can be ensured.

Additionally, various preset display modes for the operating system can be included. For example, for the flip dual screen dual system phone, the operating system can be set to be displayed on the outer display screen, and can also be set to be displayed on the inner display screen. When the multiple operating systems are displayed on the same display screen, the operating system can be set to be displayed in a certain display region of the display screen. Furthermore, when the display region is clicked, it is determined that an adjusting command is input. When the user clicks the display region, the operating system displayed in the display region is displayed in full screen, and other operating systems are run in the background and are hidden.

In a further aspect of the present disclosure, a multi-system terminal is provided. The multi-system terminal includes a communication bus, an output and input device, a memory, and a processor. Wherein, the communication bus is configured to realize communication among the output and input device, the memory, and the processor. The memory stores a set of program codes. The processor is configured to invoke the set of program codes stored in the memory to execute following operations: the processor being configured to run the multiple operating systems simultaneously; and the output and input display device being configured to display each of the multiple operating systems in a preset display mode.

In the above technical solution, preferably, the preset display mode includes: displaying any of the multiple operating systems on any display screen separately; or displaying both of the any of the multiple operating systems and at least one other operating system of the multiple operating systems on the any display screen; or hiding the any of the multiple operating systems.

In the above technical solution, preferably, the processor is further configured to execute following steps: setting any of the multiple operating systems to be a main system according to a received setting command; when the processor detects a command or request which is not able to be determined for which of the multiple operating systems, receiving and processing the command or request by the main system.

In the above technical solution, preferably, the processor is further configured to execute following steps: adjusting a time proportion that any of the multiple operating systems takes up a central processing unit of the terminal and/or a memory proportion that any of the multiple operating systems takes up a memory of the terminal according to a received adjusting command. Wherein, the adjusting command is configured to turn on or turn off the display screen which is used for displaying the any of the multiple operating systems, or the adjusting command is configured to change the preset display mode for the any of the multiple operating systems.

By means of the above technical solutions, all of multiple operating systems that are run simultaneously can be displayed on one or more display screens, thus restarting the terminal can be avoided when switching operating systems, and a user can directly operate the multiple operating systems, which facilitates user's operation and improves user's experience.

DETAILED DESCRIPTION

To understand the above-mentioned purposes, features and advantages of the present disclosure more clearly, the present disclosure will be further described in detail below in combination with the accompanying drawings and the specific implementations. It should be noted that, the embodiments of the present application and the features in the embodiments may be combined with one another without conflicts.

Many specific details will be described below for sufficiently understanding the present disclosure. However, the present disclosure may also be implemented by adopting other manners different from those described herein. Accordingly, the protection scope of the present disclosure is not limited by the specific embodiments disclosed below.

Figure 1:
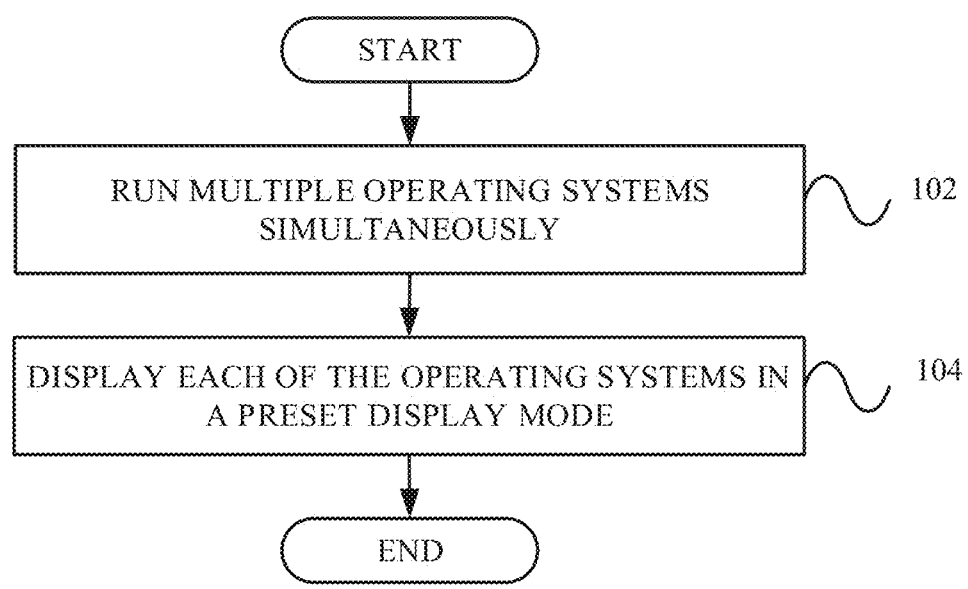
FIG. 1 is a flow chart of a display method for operating systems in accordance with an embodiment of the present disclosure.

FIG. 1 is a flow chart of a display method for operating systems in accordance with an embodiment of the present disclosure.

As shown in FIG. 1, a display method for operating systems in accordance with an embodiment of the present disclosure is applied in a terminal which has multiple operating systems. The display method for operating systems includes the following.

Step 102, the multiple operating systems of the terminal are run simultaneously.

Step 104, each of the multiple operating systems is displayed in a preset display mode.

In the technical solution, different operating systems are installed in different parts of a memory of the terminal. Multiple sets of virtual hardware can be generated by hardware virtual technology. The multiple operating systems are simultaneously run by the multiple sets of virtual hardware, and each of the multiple operating systems is displayed in a preset display mode, thus a user can operate the multiple operating systems simultaneously according to needs, which facilitates user's operation, and reduces time of switching operating systems through a human-computer interface. For example, when the user uses his or her own device in the office, the operating system for work and other ordinary operating systems of the device can be run simultaneously, thus the user can operate these operating systems simultaneously or separately to take public and private interests into account, accordingly user's operation is facilitated, and time for switching systems is reduced.

In the technical solution, preferably, the preset display mode includes: displaying any of the multiple operating systems on any display screen separately; or displaying both of the any of the multiple operating systems and at least one other operating system of the multiple operating systems on the any display screen; or hiding the any of the multiple operating systems.

In the technical solution, different operating systems can be displayed on different display screens, and multiple operating systems can also be displayed on one display screen. Wherein, when the multiple operating systems are displayed on one display screen, the display screen can be divided into multiple display regions, and each display region is configured to display one operating system interface. Additionally, a display status of the operating system displayed on the display screen can be set to be a hidden status. Hiding the operating system referred herein is similar to minimizing a window. That is, the hidden operating system is still run, and the user can cause the hidden operating system to be displayed on the display screen at any time via inputting a display command. By means of the technical solution, a display method for multiple operating systems is provided, thus user's various requirements can be satisfied.

In the above technical solution, preferably, the display method further includes: setting any of the multiple operating systems to be a main system according to a received setting command; and when the terminal detects a command or request which is not able to be determined for which of the multiple operating systems, receiving and processing the command or request by the main system.

In the technical solution, although multiple sets of virtual hardware are generated by the hardware virtual technology, actually the terminal just has one set of hardware, thus under many conditions, the terminal cannot determine that a received request or command is for which of the operating systems. Therefore, by setting the main system, the command or request which cannot be determined for which of the operating systems can be sent to the main system, and the main system receives and processes the command or request. For example, a terminal has an operating system A and an operating system B, and the operating system A is set to be the main system. When the terminal displays both of the running operating system A and the running operating system B on the display screen, if a page refresh command from a keyboard is detected, as it cannot be determined that the page refresh command is for the operating system A, the operating system B, or both of the operating system A and the operating system B, the operating system A which is set to be the main system receives the page refresh command, and executes the page refresh command and/or instructs the operating system B to execute the page refresh command.

In the above technical solution, preferably, the display method further includes: adjusting a time proportion that any of the multiple operating systems takes up a central processing unit of the terminal and/or a memory proportion that any of the multiple operating systems takes up a memory of the terminal according to a received adjusting command.

In the technical solution, when the user needs performance of a certain running operating system to be high, the time proportion that the operating system takes up the central processing unit and/or the memory proportion that the operating system takes up the memory of the terminal can be set to be high, thus the operating system can take up more disk space, and the running efficiency of the operating system can be enhanced, accordingly user's requirements can be satisfied.

In the above technical solution, preferably, the adjusting command is configured to turn on or turn off the display screen which is used for displaying any of the multiple operating systems, or the adjusting command is configured to change the preset display mode for any of the multiple operating systems.

In the technical solution, by adjusting the time proportion that each operating system takes up the central processing unit of the terminal and/or the memory proportion that each operating system takes up the memory of the terminal at any time, a high running speed and a high storing speed of the operating system which is currently used by the user can be obtained, accordingly user's experience is improved. For example, for a flip dual screen dual system phone, when an action of opening or closing a cover is executed, it is determined that an adjusting command is input. When the user opens the cover, generally speaking, it means that the user wants to watch content displayed on an inner display screen, and does not need to watch content displayed on an outer display screen. Therefore, when receiving the adjusting command generated by opening the cover, the time proportion that the operating system displayed on the outer display screen takes up the central processing unit of the terminal and/or the memory proportion that the operating system displayed on the outer display screen takes up the memory of the terminal can be reduced to be least, and the high work efficiency of the operating system displayed on the inner display screen can be ensured.

Additionally, various preset display modes for the operating system can be included. For example, for the flip dual screen dual system phone, the operating system can be set to be displayed on the outer display screen, and can also be set to be displayed on the inner display screen. When the multiple operating systems are displayed on the same display screen, the operating system can be set to be displayed in a certain display region of the display screen. Furthermore, when the display region is clicked, it is determined that an adjusting command is input. When the user clicks the display region, the operating system displayed in the display region is displayed in full screen, and other operating systems are run in the background and are hidden.

Figure 2:
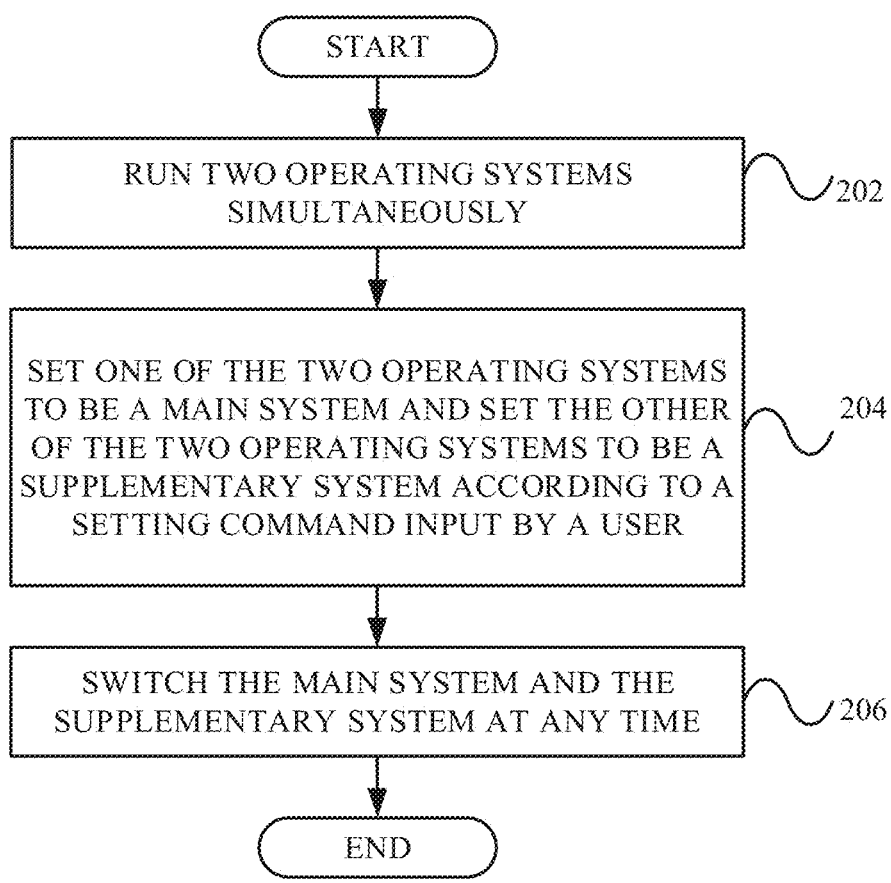
FIG. 2 is a flow chart of a display method for operating systems in accordance with another embodiment of the present disclosure.

FIG. 2 is a flow chart of a display method for operating systems in accordance with another embodiment of the present disclosure.

As shown in FIG. 2, a display method for operating systems in accordance with another embodiment of the present disclosure is applied in a terminal which has two operating systems. The display method for operating systems includes the following.

Step 202, two operating systems are run simultaneously. A set of virtual hardware can be generated by hardware virtual technology, and the hardware of the terminal and the virtual hardware run the two operating systems simultaneously, which facilitates a user to operate the two operating systems simultaneously or separately.

Step 204, one of the two operating systems is set to be a main system and the other of the two operating systems is set to be a supplementary system according to a setting command input by a user. By means of the technical solution, both of the main system and the supplementary system can be displayed in different display modes. For example, when a flip phone is used, the operating system displayed on an inner display screen can be set to be the main system, and the operating system displayed on an outer display screen can be set to be the supplementary system. Additionally, although a set of virtual hardware is generated by the hardware virtual technology, actually the terminal just has one set of hardware, thus under many conditions, the terminal cannot determine that a received request or command is for which of the operating systems. Therefore, by setting the main system, the command or request which cannot be determined for which of the operating systems can be sent to the main system, and the main system receives and processes the command or request. For example, when a page refresh command from a keyboard is detected, as it cannot be determined that the page refresh command is for the main system, the supplementary system, or both of the main system and the supplementary system, the main system receives the page refresh command, and executes the page refresh command and/or instructs the supplementary system to execute the page refresh command.

Step 206, the main system and the supplementary system are switched at any time. The main system and the supplementary system can be switched at any time according to user's actual needs. For example, when the user uses the flip phone, after opening the cover, the operating system displayed on the inner display screen is set to be the main system, and after closing the cover, the operating system displayed on the outer display screen is set to be the main system, thus user's operation is facilitated.

Figure 3:
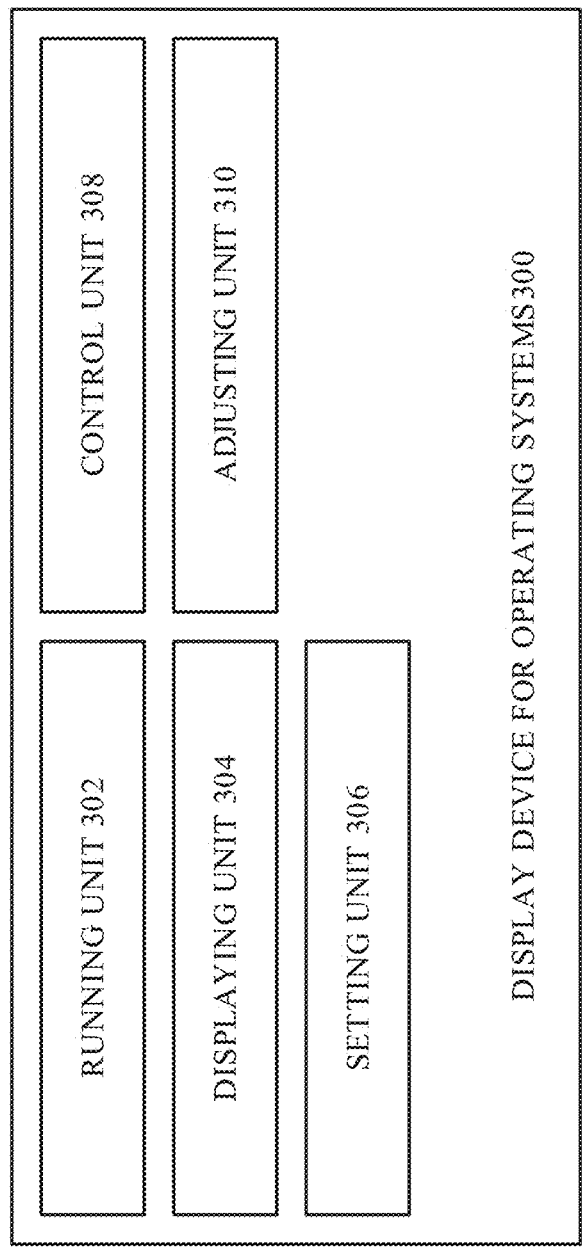
FIG. 3 is a block diagram of a display device for operating systems in accordance with an embodiment of the present disclosure.

FIG. 3 is a block diagram of a display device for operating systems in accordance with an embodiment of the present disclosure.

As shown in FIG. 3, a display device 300 for operating systems in accordance with an embodiment of the present disclosure is applied in a terminal which has multiple operating systems. The display device 300 includes a running unit 302 configured to run the multiple operating systems simultaneously, and a displaying unit 304 configured to display each of the multiple operating systems in a preset display mode.

In the technical solution, different operating systems are installed in different parts of a memory of the terminal. Multiple sets of virtual hardware can be generated by hardware virtual technology. The multiple operating systems are simultaneously run by the multiple sets of virtual hardware, and each of the multiple operating systems is displayed in a preset display mode, thus a user can operate the multiple operating systems simultaneously according to needs, which facilitates user's operation, and reduces time of switching operating systems through a human-computer interface. For example, when the user uses his or her own device in the office, the operating system for work and other ordinary operating systems can be run simultaneously, thus the user can operate these operating systems simultaneously or separately to take public and private interests into account, accordingly user's operation is facilitated, and time for switching systems is reduced.

In the technical solution, preferably, the preset display mode includes: displaying any of the multiple operating systems on any display screen separately; or displaying both of the any of the multiple operating systems and at least one other operating system of the multiple operating systems on the any display screen; or hiding the any of the multiple operating systems.

In the technical solution, different operating systems can be displayed on different display screens, and multiple operating systems can also be displayed on one display screen. Wherein, when the multiple operating systems are displayed on one display screen, the display screen can be divided into multiple display regions, and each display region is configured to display one operating system interface. Additionally, a display status of the operating system displayed on the display screen can be set to be a hidden status. Hiding the operating system referred herein is similar to minimizing a window. That is, the hidden operating system is still run, and the user can cause the hidden operating system to be displayed on the display screen at any time via inputting a display command. By means of the technical solution, a display method for multiple operating systems is provided, thus user's various requirements can be satisfied.

In the above technical solution, preferably, the display device 300 further includes a setting unit 306 configured to set any of the multiple operating systems to be a main system according to a received setting command, and a control unit 308. The control unit 308 is configured to control the main system to receive and process a command or request when the control unit 308 detects the command or request which is not able to be determined for which of the multiple operating systems.

In the technical solution, although multiple sets of virtual hardware are generated by the hardware virtual technology, actually the terminal just has one set of hardware, thus under many conditions, the terminal cannot determine that a received request or command is for which of the operating systems. Therefore, by setting the main system, the command or request which cannot be determined for which of the operating systems can be sent to the main system, and the main system receives and processes the command or request. For example, a terminal has an operating system A and an operating system B, and the operating system A is set to be the main system. When the terminal displays both of the running operating system A and the running operating system B on the display screen, if a page refresh command from a keyboard is detected, as it cannot be determined that the page refresh command is for the operating system A, the operating system B, or both of the operating system A and the operating system B, the operating system A which is set to be the main system receives the page refresh command, and executes the page refresh command and/or instructs the operating system B to execute the page refresh command.

In the above technical solution, preferably, the display device 300 further includes an adjusting unit 310 configured to adjust a time proportion that any of the multiple operating systems takes up a central processing unit of the terminal and/or a memory proportion that any of the multiple operating systems takes up a memory of the terminal according to a received adjusting command.

In the technical solution, when the user wants performance of a certain running operating system to be high, the user can set the time proportion that the operating system takes up the central processing unit and/or the memory proportion that the operating system takes up the memory of the terminal to be high, thus the operating system can take up more disk space, and the running efficiency of the operating system can be enhanced, accordingly user's requirements can be satisfied.

In the above technical solution, preferably, the adjusting command is configured to turn on or turn off the display screen which is used for displaying any of the multiple operating systems, or the adjusting command is configured to change the preset display mode for any of the multiple operating systems.

In the technical solution, by adjusting the time proportion that each operating system takes up the central processing unit of the terminal and/or the memory proportion that each operating system takes up the memory of the terminal at any time, a high running speed and a high storing speed of the operating system which is currently used by the user can be obtained, accordingly user's experience is improved. For example, for a flip dual screen dual system phone, when an action of opening or closing a cover is executed, it is determined that an adjusting command is input. When the user opens the cover, generally speaking, it means that the user wants to watch content displayed on an inner display screen, and does not need to watch content displayed on an outer display screen. Therefore, when receiving the adjusting command generated by opening the cover, the time proportion that the operating system displayed on the outer display screen takes up the central processing unit of the terminal and/or the memory proportion that the operating system displayed on the outer display screen takes up the memory of the terminal can be reduced to be least, and the high work efficiency of the operating system displayed on the inner display screen can be ensured.

Additionally, various preset display modes for the operating system can be included. For example, for the flip dual screen dual system phone, the operating system can be set to be displayed on the outer display screen, and can also be set to be displayed on the inner display screen. When the multiple operating systems are displayed on the same display screen, the operating system can be set to be displayed in a certain display region of the display screen. Furthermore, when the display region is clicked, it is determined that an adjusting command is input. When the user clicks the display region, the operating system displayed in the display region is displayed in full screen, and other operating systems are run in the background and are hidden.

Figure 4:
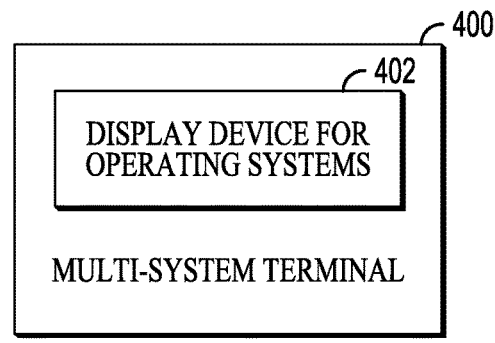
FIG. 4 is a block diagram of a multi-system terminal in accordance with an embodiment of the present disclosure.

FIG. 4 is a block diagram of a multi-system terminal in accordance with an embodiment of the present disclosure.

As shown in FIG. 4, a multi-system terminal 400 in accordance with an embodiment of the present disclosure includes a display device 402 for operating systems (the same as the display device 300 for operating systems which is illustrated in the embodiment of FIG. 3). Multiple sets of virtual hardware can be generated by hardware virtual technology. The multiple operating systems are simultaneously run by the multiple sets of virtual hardware, and each of the multiple operating systems is displayed in a preset display mode, thus a user can operate the multiple operating systems simultaneously according to needs, which facilitates user's operation, and reduces time of switching operating systems.

In the multi-system terminal 400, the preset display mode for the operating systems includes: displaying any of the multiple operating systems on any display screen separately; or displaying both of the any of the multiple operating systems and at least one other operating system of the multiple operating systems on the any display screen; or hiding the any of the multiple operating systems.

In the technical solution, different operating systems can be displayed on different display screens of the multi-system terminal 400, and multiple operating systems can also be displayed on one display screen of the multi-system terminal 400. Wherein, when the multiple operating systems are displayed on one display screen, the display screen can be divided into multiple display regions, and each display region is configured to display one operating system interface. Additionally, a display status of the operating system displayed on the display screen can be set to be a hidden status. Hiding the operating system referred herein is similar to minimizing a window. That is, the hidden operating system is still run, and the user can cause the hidden operating system to be displayed on the display screen at any time via inputting a display command. By means of the technical solution, a display method for multiple operating systems is provided, thus user's various requirements can be satisfied.

In the multi-system terminal 400, any of the multiple operating systems can be set to be a main system according to a received setting command. When the multi-system terminal 400 detects a command or request which is not able to be determined for which of the multiple operating systems, the main system is controlled to receive and process the command or request.

In the technical solution, although multiple sets of virtual hardware are generated by the hardware virtual technology, actually the terminal just has one set of hardware, thus under many conditions, the terminal cannot determine that a received request or command is for which of the operating systems. Therefore, by setting the main system, the command or request which cannot be determined for which of the operating systems can be sent to the main system, and the main system receives and processes the command or request. For example, a terminal has an operating system A and an operating system B, and the operating system A is set to be the main system. When the terminal displays both of the running operating system A and the running operating system B on the display screen, if a page refresh command from a keyboard is detected, as it cannot be determined that the page refresh command is for the operating system A, the operating system B, or both of the operating system A and the operating system B, the operating system A which is set to be the main system receives the page refresh command, and executes the page refresh command and/or instructs the operating system B to execute the page refresh command.

In the multi-system terminal 400, a time proportion that any of the multiple operating systems takes up a central processing unit of the multi-system terminal 400 and/or a memory proportion that any of the multiple operating systems takes up a memory of the multi-system terminal 400 can be adjusted according to a received adjusting command.

In the technical solution, when the user wants performance of a certain running operating system to be high, the user can set the time proportion that the operating system takes up the central processing unit and/or the memory proportion that the operating system takes up the memory of the terminal to be high, thus the operating system can take up more disk space, and the running efficiency of the operating system can be enhanced, accordingly user's requirements can be satisfied.

Wherein, the adjusting command is configured to turn on or turn off the display screen which is used for displaying any of the multiple operating systems, or the adjusting command is configured to change the preset display mode for any of the multiple operating systems.

In the technical solution, by adjusting the time proportion that each operating system takes up the central processing unit of the terminal and/or the memory proportion that each operating system takes up the memory of the terminal at any time, a high running speed and a high storing speed of the operating system which is currently used by the user can be obtained, accordingly user's experience is improved. For example, for a flip dual screen dual system phone, when an action of opening or closing a cover is executed, it is determined that an adjusting command is input. When the user opens the cover, generally speaking, it means that the user wants to watch content displayed on an inner display screen, and does not need to watch content displayed on an outer display screen. Therefore, when receiving the adjusting command generated by opening the cover, the time proportion that the operating system displayed on the outer display screen takes up the central processing unit of the terminal and/or the memory proportion that the operating system displayed on the outer display screen takes up the memory of the terminal can be reduced to be least, and the high work efficiency of the operating system displayed on the inner display screen can be ensured.

Additionally, various preset display modes for the operating system can be included. For example, for the flip dual screen dual system phone, the operating system can be set to be displayed on the outer display screen, and can also be set to be displayed on the inner display screen. When the multiple operating systems are displayed on the same display screen, the operating system can be set to be displayed in a certain display region of the display screen. Furthermore, when the display region is clicked, it is determined that an adjusting command is input. When the user clicks the display region, the operating system displayed in the display region is displayed in full screen, and other operating systems are run in the background and are hidden.

Figure 5A:
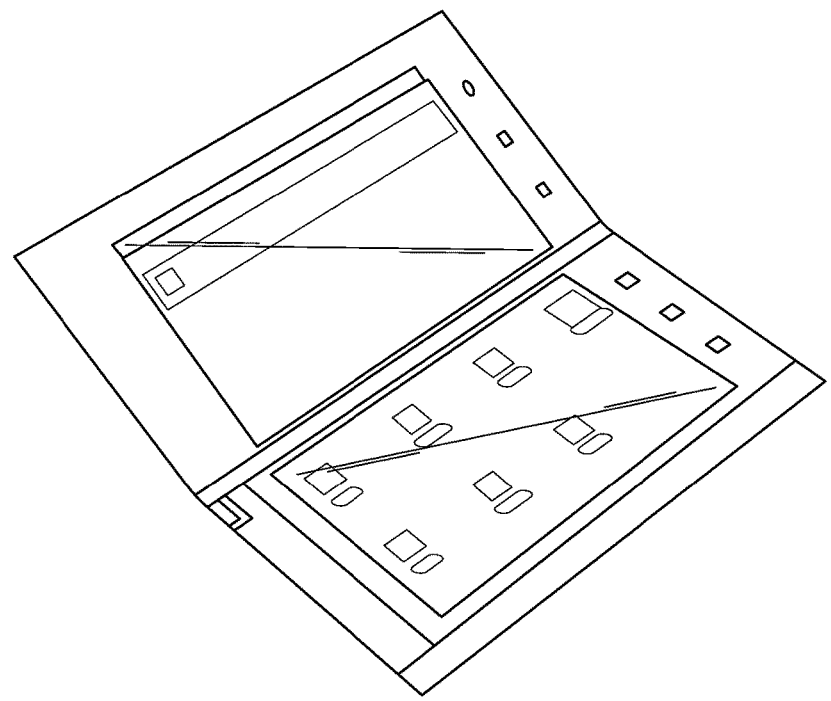
FIG. 5A is a schematic view of a tablet computer in accordance with an embodiment of the present disclosure.

FIG. 5A is a schematic view of a tablet computer in accordance with an embodiment of the present disclosure.

As shown in FIG. 5A, the tablet computer includes two display screens and two operating systems. Wherein, the two operating systems are respectively displayed on the two display screens, thus a user can operate the two operating systems simultaneously or separately.

Figure 5B:
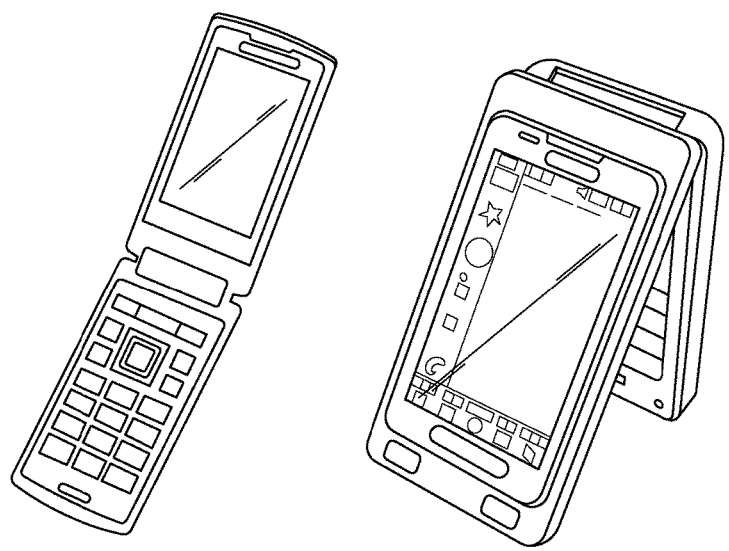
FIG. 5B is a schematic view of a flip phone in accordance with an embodiment of the present disclosure.

FIG. 5B is a schematic view of a flip phone in accordance with an embodiment of the present disclosure.

As shown in FIG. 5B, the flip phone includes two display screens and two operating systems. Wherein, the two operating systems are respectively displayed on an inner and outer display screen of the flip phone, thus a user can operate the two operating systems separately.

Figure 5C:
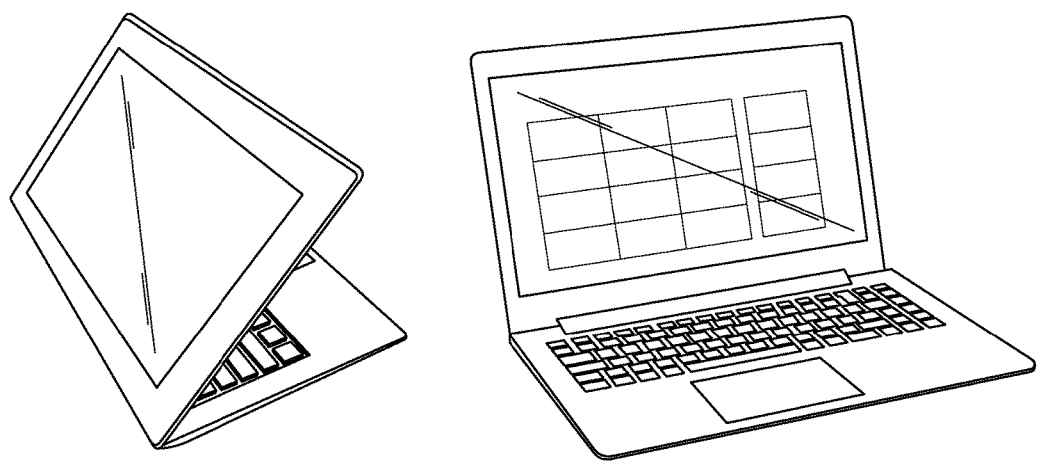
FIG. 5C is a schematic view of a laptop computer in accordance with an embodiment of the present disclosure.

FIG. 5C is a schematic view of a laptop computer in accordance with an embodiment of the present disclosure.

As shown in FIG. 5, the laptop computer includes two display screens and two operating systems. Wherein, the Windows operating system (desktop operating system developed by Microsoft Inc.) is displayed on a display screen which is arranged in an inner side of a cover, and after opening the cover, a user can operate the Windows operating system via a keyboard. The Android operating system is displayed on a display screen which is arranged in an outer side of the cover, and the user can touch the display screen arranged in the outer side of the cover to perform operation. By doing so, the user can operate the Windows operating system and Android operating system simultaneously or separately, thus user's various requirements can be satisfied, user's operation can be facilitated, and time for switching the two operating systems can be reduced.

For the above tablet computer, flip phone, and laptop computer all of which have two operating systems, different operating systems are installed in different parts of a memory of the dual system terminal. When the dual system terminal is started, the two operating systems can be simultaneously started by hardware virtual technology, thus the two operating systems can be simultaneously run. Furthermore, each of the above dual system terminal has two display screens for displaying two different operating system interfaces respectively, thus the user can operate the two operating systems simultaneously or separately. Additionally, the two operating systems can access each other's data and files in a preset security strategy.

Additionally, for each of the above dual system terminals, when the user performs a certain operation (for example, closes the cover), the time proportion that each of the two operating systems takes up a central processing unit of the dual system terminal and/or a proportion that each of the two operating systems takes up a memory of the dual system terminal can be adjusted until one of the two operating systems enters a full sleep state.

The above dual system terminals can take public and private interests into account. Operating the two operating systems simultaneously or separately, user's BYOD (BYOD, bring your own device) requirement can be satisfied, and connecting two independent display screens and/or touch screens through a hardware platform (a set of central processing units and memories) can be realized, thus users having different requirements can operate different operating systems simultaneously or separately.

Figure 6:
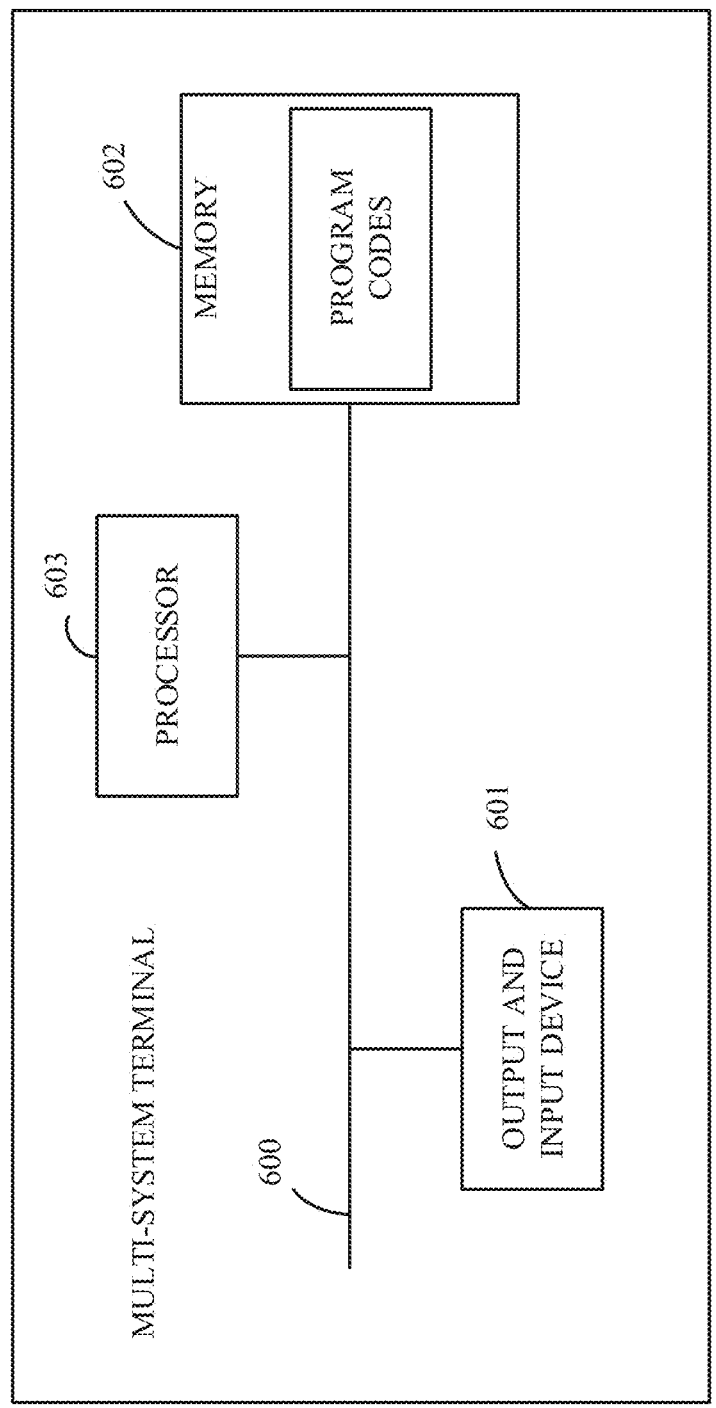
FIG. 6 is a block diagram of a multi-system terminal in accordance with another embodiment of the present disclosure.

FIG. 6 is a block diagram of a multi-system terminal in accordance with another embodiment of the present disclosure.

As shown in FIG. 6, a multi-system terminal includes a communication bus 600, an output and input device 601, a memory 602, and a processor 603 (the multi-system terminal can have one or more processors 603, in FIG. 6, as an example, one processor is shown).

The communication bus 600 is configured to realize communication among the output and input device 601, the memory 602, and the processor 603.

The memory 602 stores a set of program codes, and the processor 603 invokes the set of program codes stored in the memory 602 to execute following operations.

The processor 603 is configured to run multiple operating systems.

The output and input device 601 is configured to display each of the multiple operating systems in a preset display mode.

In the above technical solution, preferably, the preset display mode includes: displaying any of the multiple operating systems on any display screen separately; or displaying both of the any of the multiple operating systems and at least one other operating system of the multiple operating systems on the any display screen; or hiding the any of the multiple operating systems.

In the above technical solution, preferably, the processor 603 is further configured to execute following steps: setting any of the multiple operating systems to be a main system; when the processor 603 detects a command or request which is not able to be determined for which of the multiple operating systems, receiving and processing the command or request by the main system.

In the above technical solution, preferably, the processor 603 is further configured to execute following steps: adjusting a time proportion that any of the multiple operating systems takes up a central processing unit of the terminal and/or a memory proportion that any of the multiple operating systems takes up a memory of the terminal according to a received adjusting command.

Wherein, the adjusting command is configured to turn on or turn off the display screen which is used for displaying any of the multiple operating systems, or the adjusting command is configured to change the preset display mode for the any of the multiple operating systems.

The above specifically illustrates the technical solution of the present disclosure in conjunction with the accompanying drawings. By means of the technical solution of the present disclosure, multiple operating systems that are run simultaneously can be displayed on one or more display screens, restarting a terminal can be avoided when switching the operating systems, thus a user can operate the multiple operating systems simultaneously or separately, which facilitates user's operation and improves user's experience.

The foregoing descriptions are merely preferred embodiments of the present disclosure, rather than limiting the present disclosure. Various modifications and alterations may be made to the present disclosure for those skilled in the art. Any modification, equivalent substitution, improvement or the like made within the spirit and principle of the present disclosure shall fall into the protection scope of the present disclosure.

What is claimed is:

1. A method of display for operating systems in a terminal having multiple operating systems, comprising:
running the multiple operating systems simultaneously;
displaying each of the multiple operating systems in a preset display mode; and
in response to turning on or off a display screen, adjusting at least one of a time proportion that any of the multiple operating systems takes up a central processing unit of the terminal or a memory proportion that any of the multiple operating systems takes up a memory of the terminal.

2. The method of claim 1, wherein the preset display mode comprises one of:
displaying the multiple operating systems on separate display screens;
displaying at least two of the multiple operating systems on a display screen; or
hiding at least one of the multiple operating systems.

3. The method of claim 1, further comprising:
setting any of the multiple operating systems to be a main system according to a received setting command; and
when the terminal detects a command or request for an undetermined operating system of the multiple operating systems, receiving and processing the command or the request by the main system.

4. A device for displaying operating systems in a terminal having multiple operating systems, comprising:
a running unit configured to run the multiple operating systems simultaneously;
a displaying unit configured to display each of the multiple operating systems in a preset display mode; and
an adjusting unit configured to adjust a ratio of time or memory that one of the multiple operating systems takes up of a memory or a central processing unit of the terminal according to a received adjusting command, wherein the adjusting command comprises one of:
turning on or off the display unit; and
changing the preset display mode for any of the multiple operating systems.

5. The device of claim 4, wherein the preset display mode comprises one of:
displaying the multiple operating systems on separate display screens;
displaying at least two of the multiple operating systems on a display screen; or
hiding at least one of the multiple operating systems.

6. The device of claim 4, further comprising:
a setting unit configured to set one of the multiple operating systems to be a main system according to a received setting command; and
a control unit configured to control the main system to receive and process a command or a request by the main system when the control unit detects the command or request for an undetermined operating system of the multiple operating systems.

7. A mobile terminal having first and second operating systems, comprising:
a communication bus configured to realize communication among a first display screen, a second display screen, a memory, and a processor;
the memory storing a set of program codes; and
the processor configured to invoke the set of program codes stored in the memory to execute following operations:
run the first and second operating systems simultaneously;
display the first operating system on the first display screen and the second operating system on the second display screen; and
in response to turning on or off the first display screen, adjust a ratio of time that the first operating system takes up a central processing unit of the mobile terminal or a ratio of memory that the first operating system takes up of the memory.

8. The mobile terminal of claim 7, wherein the processor is further configured to execute following operations:
set one of the multiple operating systems to be a main system based on a received setting command; and
when the processor detects a command or request for an undetermined operating system of the multiple operating systems, receive and process the command or the request by the main system.

* * * * *